United States Patent [19]

Hapke

[11] 4,451,015

[45] May 29, 1984

[54] JET ENGINE TWO DIMENSIONAL, ASYMMETRIC AFTERBURNER NOZZLE

[75] Inventor: Donald W. Hapke, Issaquah, Wash.

[73] Assignee: The Boeing Company, Seattle, Wash.

[21] Appl. No.: 306,746

[22] Filed: Sep. 29, 1981

[51] Int. Cl.³ .................. B64D 33/04; B64D 27/18; F02K 1/00
[52] U.S. Cl. .................................. 244/15; 244/53 R; 244/73 R; 239/265.33; 60/271
[58] Field of Search .................. 239/265.19, 265.23, 239/265.31, 265.33, 265.37, 265.39; 60/232, 242, 261, 271, 228, 230, 233; 244/12.5, 15, 23 D, 73 R

[56] References Cited

U.S. PATENT DOCUMENTS

| | | | |
|---|---|---|---|
| 3,614,028 | 10/1971 | Kleckner | 244/15 |
| 3,655,134 | 4/1972 | Greenland et al. | 239/265.37 |
| 4,000,611 | 1/1977 | McCardle, Jr. et al. | 60/230 |
| 4,093,122 | 6/1978 | Linderman et al. | 239/127.3 |
| 4,280,660 | 7/1981 | Wooten, Jr. et al. | 239/265.35 |

*Primary Examiner*—Trygve M. Blix
*Assistant Examiner*—Rodney Corl
*Attorney, Agent, or Firm*—Hughes, Barnard & Cassidy

[57] ABSTRACT

An improved jet engine two dimensional, asymmetric afterburner nozzle of the type adapted to be mounted on a jet engine suspended from an airfoil's wing spar structure, and characterized by its low profile configuration, simplicity of construction, and lack of interference with, or excessive intrusion into, the wing spar structural space within the airfoil; yet, which permits minimization of the included angle between the wing chord reference plane and the visual line-of-sight from the airfoil trailing edge into the jet engine nozzle while in its cruise position. More specifically, the present invention pertains to a simplified two dimensional, asymmetric convergent or CD nozzle construction, and an actuating mechanism therefore, which avoids the necessity to devote critical wing spar structural space to pneumatic load or pressure balance chambers, and wherein the nozzle may be shifted to a dry nozzle position—i.e., the cruise position—without the need for any portion of the nozzle or its actuating mechanism to move into, or otherwise interfere with, or impinge upon, the airfoil's wing spar structural space; yet, wherein the trailing edge line-of-sight into the nozzle is maintained at a minimum angle, preferably on the order of from about 2° to about 3° as measured from the wing chord reference plane.

20 Claims, 11 Drawing Figures

JET ENGINE TWO DIMENSIONAL, ASYMMETRIC AFTERBURNER NOZZLE

RELATED APPLICATION

Donald W. Hapke, Ser. No. 306,744, filed Sept. 29, 1981, for "Pressure Balance Nonaxisymmetric High Aspect Ratio Afterburner Convergent Nozzle."

BACKGROUND OF THE INVENTION

The present invention relates generally to two dimensional, asymmetric, convergent or convergent-divergent (CD) nozzles for use with aircraft jet propulsion engines; and, more particularly, to a two dimensional, high aspect ratio, afterburner convergent nozzle that finds particularly advantageous use in military-type aircraft requiring low observable infrared and cross-sectional radar detection. In its principal aspects, the invention is concerned with a jet propulsion engine afterburner nozzle which can be mounted on the engine suspended from the airfoil's wing spar structure in such a manner as to occupy only a minimum amount of the critical wing spar structural space irrespective of whether the nozzle is in a convergent dry (cruise) attitude or a wet (afterburn) attitude; yet, wherein the trailing edge line-of-sight is maintained at a minimum angle—preferably on the order of from about 2° to about 3°—with respect to the wing chord reference plane when the nozzle is in its dry or cruise position.

In the design of military jet aircraft, one of the prime considerations is to locate the jet engine relative to the supporting airfoil structure in such a manner that enemy aircraft weapons systems are precluded from looking into the engine's relatively large nozzle opening and detecting hot engine parts. It has, of course, long been recognized that one "solution" to this problem is to mount the jet engine tightly beneath the airfoil so as to provide a low profile and a minimal trailing edge line-of-sight into the nozzle. Unfortunately, however, such jet engine nozzles must be controlled so as to vary the nozzle opening between cruise and afterburn positions—i.e., between dry and wet nozzle positions. Consequently, prior art approaches to this problem have generally required relatively complex structures including static pressure load balance chambers disposed above the exhaust nozzle and within the critical internal wing spar structural envelope. The additional structural components, seals, maintenance and envelope space required have, in turn, increased the weight of the engine nozzle and the loading of the rear engine support frame. A typical example of such a device is that disclosed in McCardle, Jr. et al U.S. Pat. No. 4,000,611. However, despite such efforts at the expense of critical wing spar structural space, the trailing edge line-of-sight has remained at unacceptably high angles (on the order of about 5°, or greater) with respect to the wing chord reference plane.

Another common prior art approach has been the use of augmented deflector-type exhaust nozzles which may have additional application for short take-off and landing (STOL) and vertical take-off and landing (VTOL) type aircraft such, for example, as those disclosed in: Nash U.S. Pat. No. 3,979,067; Nash et al. U.S. Pat. Nos. 4,000,610 and 4,073,441; and, Wakeman et al U.S. Pat. No. 4,000,612. However, the complex linkages and deflector-type vanes employed have not led to minimizing the trailing edge line-of-sight; and, where such apparatus has employed rotating bonnet-type deflectors to redirect the exhaust stream, the systems have required the use of undesirable static pressure load balance chambers.

SUMMARY OF THE INVENTION

Accordingly, it is a general aim of the present invention to provide an improved low profile nozzle which overcomes the foregoing disadvantages inherent in conventional variable area nozzle constructions, and which permits the jet engine to be tucked tightly beneath the airfoil of a tactical-type aircraft without unnecessarily impinging upon and into the critical wing spar structural space; and, wherein the nozzle throat area can be easily varied between convergent cruise (dry) and afterburn (wet) nozzle positions with the movable nozzle elements and the actuating mechanisms therefore being maintained external to the critical wing spar structural space at all operative positions of the nozzle.

In another of its important aspects, it is an object of the invention to provide an improved convergent or CD afterburner nozzle particularly suitable for tactical-type aircraft and the like, characterized by its simplicity of construction, which is light in weight, and which occupies only a minimum volume of space; yet, which is highly effective, reliable, and permits reduction of the angle between the wing chord reference plane and the trailing edge line-of-sight into the nozzle opening at cruise conditions without requiring any static pressure load balancing chambers disposed within the critical wing spar structural space above the nozzle and, therefore, which eliminates the need for complex seals and extensive maintenance and envelope space within the critical wing spar structural space to accommodate the movable nozzle elements.

A further object of the invention is to provide a simple apparatus for varying the exhaust throat area of an asymmetric afterburner nozzle which is highly versatile and wherein the nozzle components and actuating mechanisms therefore permit of use with a broad spectrum of engines and nozzle aspect ratio designs.

A more detailed objective of the invention is the provision of an improved convergent afterburner nozzle which employs an adjustable nozzle swing tray defining the bottom wall, or floor, and portions of the sidewalls of the variable area nozzle, with the swing tray being supported solely by a four-bar linkage mechanism; and, wherein the swing tray can be rocked about the pivot points defined by the four-bar linkage mechanism with essentially pendular or rocking motion between a dry nozzle or cruise position defining a minimal nozzle opening and a wet nozzle or afterburn position defining a maximum nozzle opening by the application of relatively low forces applied by generally horizontally oriented actuating means which serve to rock or translate the lower swing tray between its limit positions and, wherein the four-bar linkage mechanism carries essentially all of the static pressure loads incurred at all nozzle operating positions.

Briefly stated, the foregoing objectives are attained by providing a variable area nozzle casing having: (i) a stationary upper nozzle duct tucked tightly beneath the wing spar structure with such duct defining a fixed upper nozzle wall and a pair of depending spaced nozzle sidewalls; (ii) a translatable lower swing tray defining a transverse floor and having a pair of upstanding spaced nozzle sidewalls positioned to be juxtaposed with respect to the depending sidewalls of the stationary nozzle duct in overlapping relation with respect thereto and with freedom for relative movement with respect thereto; (iii) a four-bar linkage mechanism for supporting the lower swing tray from the upper nozzle duct with freedom for controlled rocking or pendular translation with respect thereto with the four-bar linkage assembly carrying essentially all of the static pressure loads at the different nozzle operating positions; and (iv), generally horizontally oriented actuator means for supplying the relatively low forces necessary to reposition the four-bar linkage mechanism so as to rock the swing tray aft to a convergent cruise position defining an included angle $\theta$ on the order of about 2° to about 3° between the trailing edge line-of-sight and the wing chord reference plane, and forward to an afterburn position; yet, wherein the critical wing spar structural space occupied by the jet engine nozzle remains fixed and minimized at all operating positions of the nozzle and wherein no pressure balance chambers are required to compensate for static pressure loads.

DESCRIPTION OF THE DRAWINGS

These and other objects and advantages of the present invention will become more readily apparent upon reading the following detailed description and upon reference to that attached drawings, in which:

FIG. 7 is an elevational view similar to that shown in FIG. 6, but here illustrating the nozzle of the present invention in the afterburn or wet position;

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Figure 1:
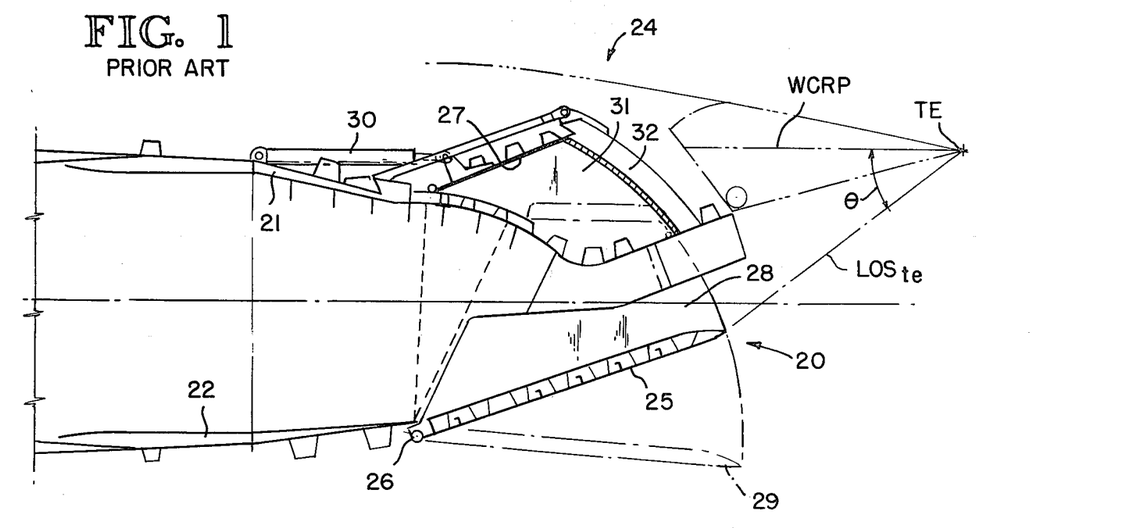
FIG. 1 is a fragmentary, somewhat diagrammatic vertical sectional view illustrating a coventional prior art variable area asymmetric load balance exhaust nozzle as mounted in an airfoil, illustrated in phantom, and depicting particularly the critical volume of wing spar structural space occupied by the nozzle when in the cruise position, as well as the unacceptably high trailing edge line-of-sight angle—an angle $\theta$ which is here on the order of between 35° and 40°.

Referring first to FIG. 1, there has been diagrammatically illustrated a conventional asymmetric load balancing exhaust nozzle system, generally indicated at 20, which is well-known to those skilled in the art. Briefly, the conventional exhaust nozzle system 20 includes a nozzle casing 21 mounted co-axial with, and aft of, a conventional jet engine afterburner or augmentor casing 22; with the jet engine being mounted on, and suspended beneath, the wing spar structure (not shown) of an airfoil, generally indicated in phantom at 24, having a trailing edge TE. As here shown, the variable area nozzle assembly 20 includes a flap assembly 25 hingedly connected at 26 to the lower portion of the nozzle casing 21, with the flap assembly having a pair of upwardly extending nozzle sidewalls, one of which is shown at 28. In this illustrative device, the flap assembly 25, nozzle sidewalls 28, and upper cover 27 are adapted to be pivoted about the hinged connection 26 between a cruise, or dry, position depicted in solid lines to an afterburn, or wet, position indicated in phantom at 29 by means of an actuator 30 which may take any conventional form well known to those skilled in the art and which will not be further described in detail herein. Mounted within the rear portion of the wing spar structural space is a pressure chamber 31 having a pressure chamber back-up plate 32 and defining a totally enclosed, sealed, pressurized chamber for balancing static load pressures as the nozzle throat area is varied.

The arrangement is such that when the variable area nozzle actuator 30 is actuated to pivot the flap assembly 25 and sidewalls 28 from the afterburn position depicted in phantom at 29 to the solid line cruise position depicted in the drawings, the flap assembly sidewalls 28 move upwardly into the wing spar structural space. The pneumatic load balancing pressure chamber 31 serves to balance static pressure loads as the nozzle area is reduced. Of course, those skilled in the art will appreciate that a static pressure load balancing system of the type here depicted not only requires dedication of a significant portion of the critical wing spar structural space to provide for movement of the nozzle sidewalls 28 and to accommodate the static pressure balancing chamber 31 but, moreover, extensive complex sealing arrangements (not shown in detail) are required at the hinge connection 26, between the sidewalls 28 and the pressure chamber back-up plate 32, and between the sidewalls 28 and the surfaces defining the pressure chamber 31. In conventional installations, the trailing edge line-of-sight $LOS_{te}$ when the nozzle assembly 20 is in the solid line cruise position depicted, generally defines an included angle $\theta$ with respect to the wing chord reference plane WCRP which, in the exemplary case here illustrated, may range from on the order of 35° to on the order of 40°.

Figure 2:
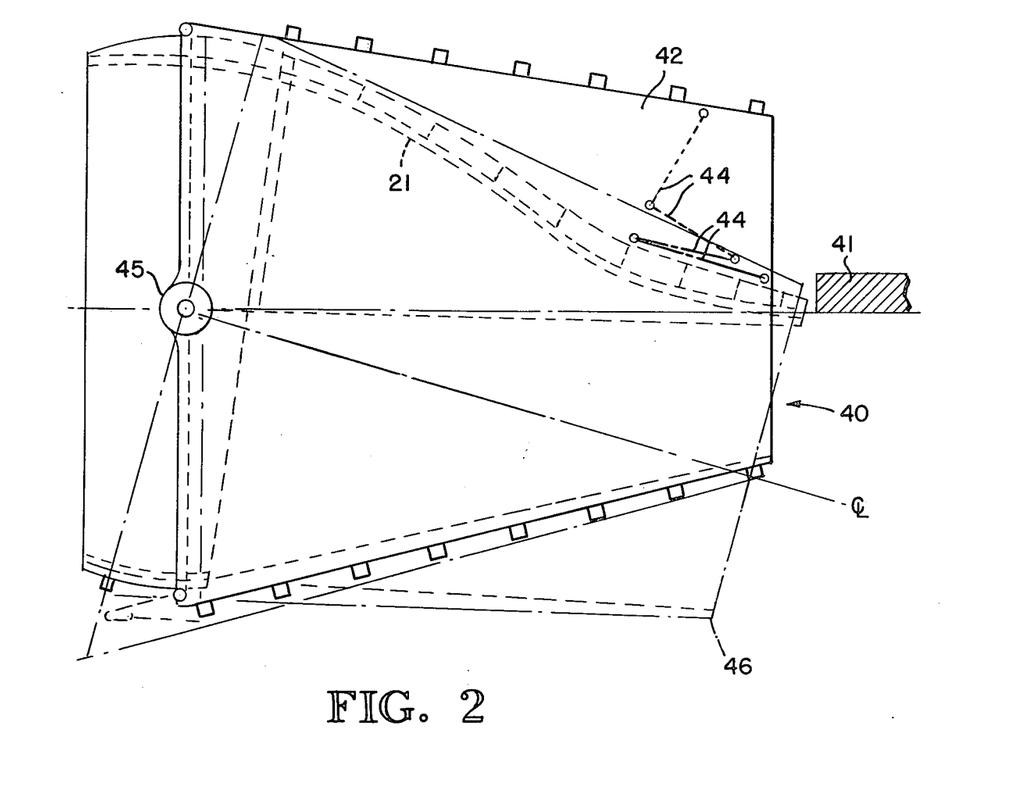
FIG. 2 is a fragmentary diagrammatic vertical sectional view similar to FIG. 1, but here illustrating the asymmetric load balance exhaust nozzle shown in FIG. 1 as modified for adaptation in a low profile tactical aircraft installation in accordance with the invention disclosed and claimed in the aforesaid copending application Ser. No. 306,744, filed Sept. 29, 1981.

Turning next to FIG. 2, there has been illustrated a modified form of asymmetric load balancing exhaust nozzle generally indicated in diagrammatic form at 40. As here shown, the nozzle casing 21 terminates at its aft end adjacent a heat shield 41 which is mounted on the lower surface of the airfoil (not shown). As in the prior art construction described above in connection with FIG. 1, the nozzle assembly 40 requires a static pressure load balance chamber, generally indicated at 42, which is disposed within the wing spar structural space. Suitable seals such, for example, as the side seal 44 diagrammatically illustrated in FIG. 2, are provided to maintain a totally enclosed sealed static pressure load balancing system at all operative positions of the nozzle assembly. In this modified construction, the nozzle assembly 40 is pivoted for rotation about a transverse axis 45 by means of any suitable actuating device (not shown) between a cruise position as indicated in solid lines and an afterburn position as indicated in phantom at 46.

Figure 3:
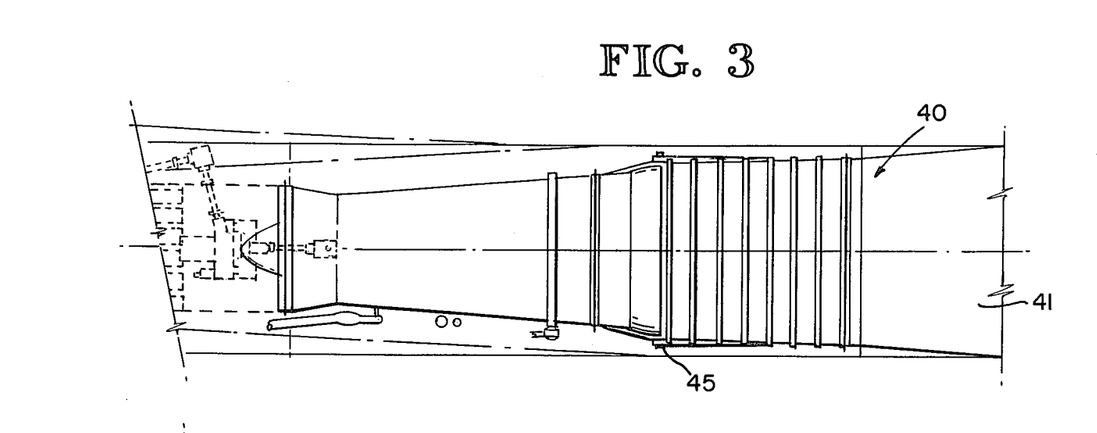
FIG. 3 is a fragmentary plan view of the modified asymmetric load balance exhaust nozzle depicted in FIG. 2.
Figure 4:
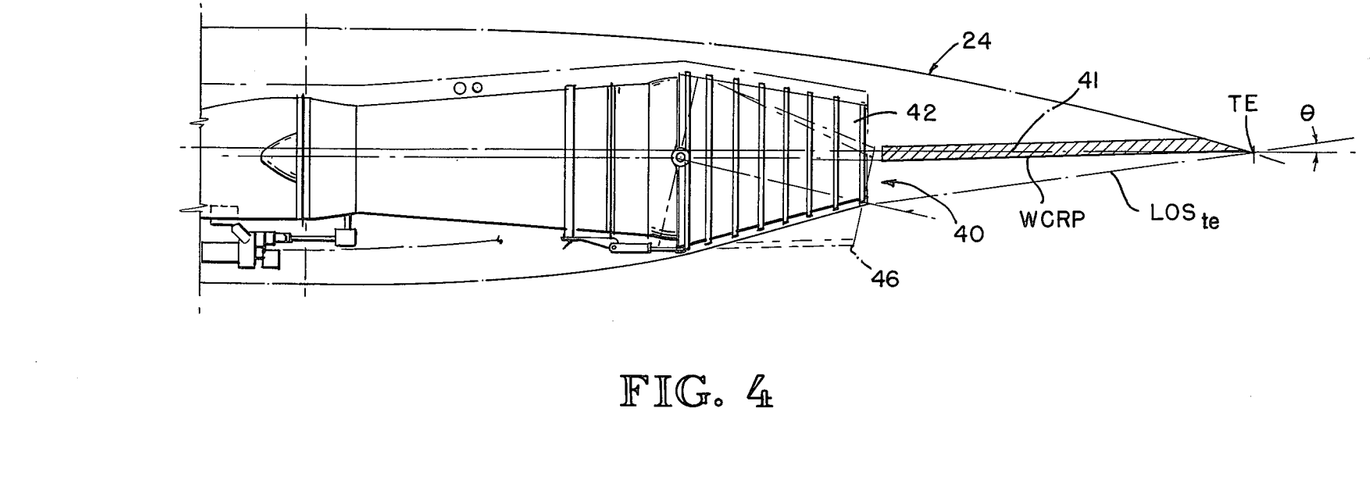
FIG. 4 is a fragmentary, somewhat diagrammatic elevational view of the modified nozzle shown in FIGS. 2 and 3 here mounted under an airfoil (shown in phantom), depicting particularly the unacceptable intrusion of the nozzle into the critical wing spar structural space and, illustrating also the resulting unacceptably high trailing edge line-of-sight angle with the wing chord reference plane, an included angle $\theta$ ranging between 5° and 10° when the nozzle is in the cruise position.

As best illustrated in FIGS. 3 and 4, it will be noted that the modified asymmetric load balance exhaust nozzle 40 has been mounted within the critical wing spar structural space of an airfoil 24 in such a manner that the static pressure load balance chamber 42 is totally contained within the critical wing spar structural space. Upon actuation of the nozzle assembly 40 to shift the nozzle from the afterburn position indicated in phantom at 46 to the cruise position shown in solid lines, the nozzle assembly moves upwardly into the wing spar structural space; but, the requirement for a large overhead static pressure load balance chamber 42 means that the trailing edge line-of-sight $LOS_{te}$ defines an included angle $\theta$ with the wing chord reference plane WCRP which, although substantially less than the angle depicted in FIG. 1, is nevertheless an unacceptably high line-of-sight angle ranging from on the order of about 5° to about 10°, dependent upon such variables as nozzle size and nozzle placement with respect to the trailing edge TE of the airfoil 24.

Figure 5:
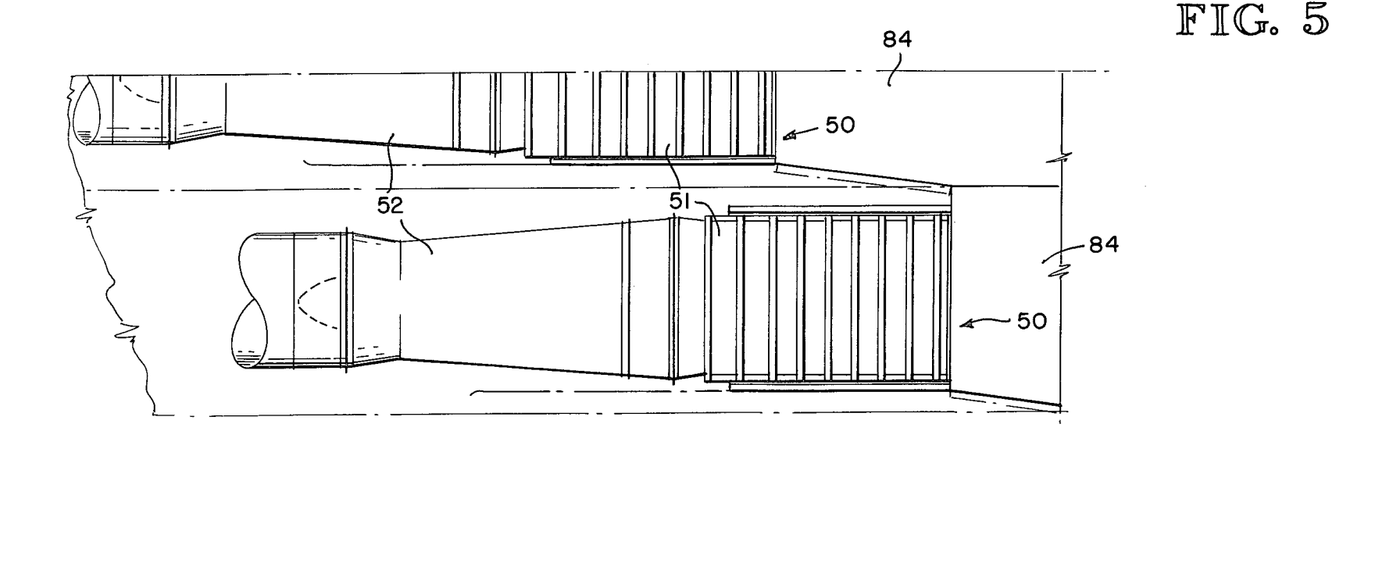
FIG. 5 is a fragmentary plan view here illustrating a pair of adjacent jet propulsion engines embodying the asymmetric afterburner nozzle of the present invention mounted under an airfoil wing spar structure.
Figures 7, 11:
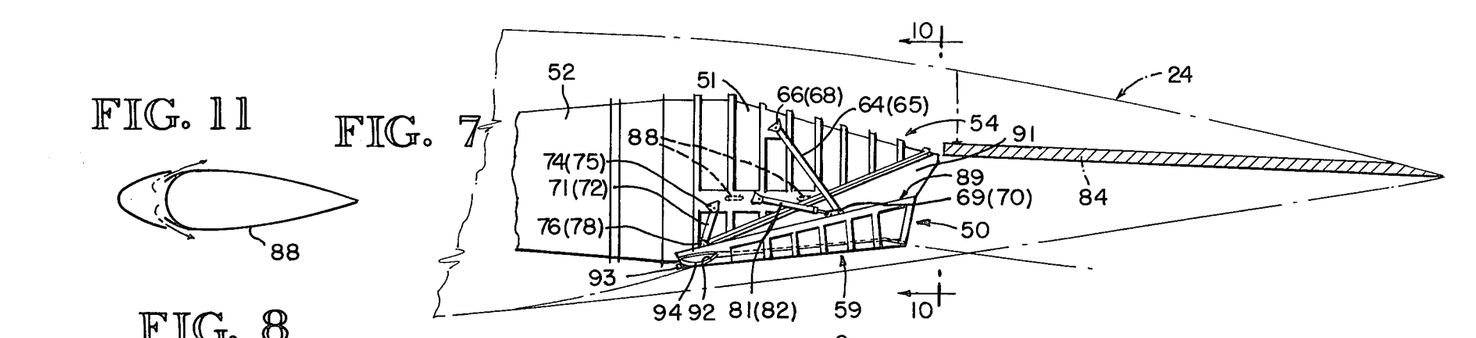
Figure 8:
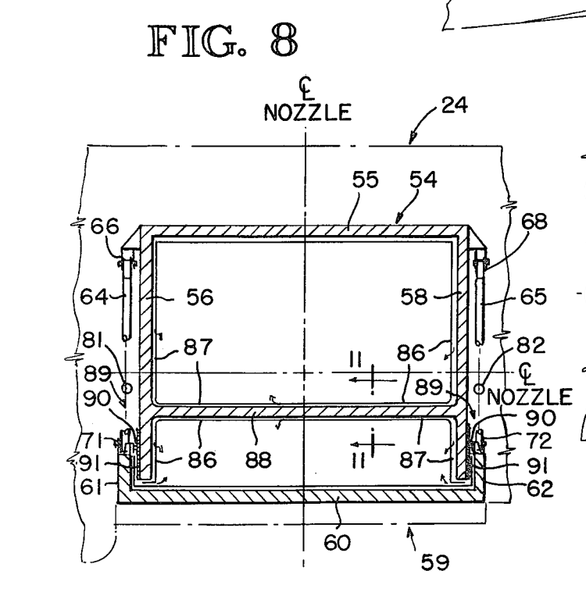
FIG. 8 is a transverse sectional view taken substantially along the line 8—8 in FIG. 6, here illustrating the relative position of the nozzle components when the nozzle components are in the convergent or dry cruise position.
Figures 9, 10:
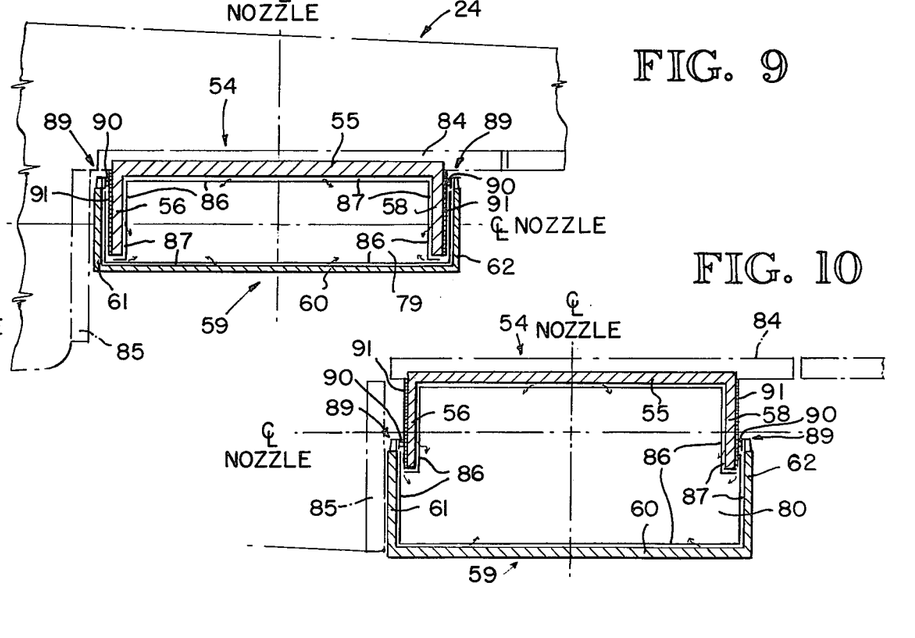
FIG. 9 is an end view taken substantially along the line 9—9 in FIG. 6 and here depicting the nozzle opening when the nozzle of the present invention is in the convergent cruise or dry position.
FIG. 10 is a transverse end view similar to FIG. 9, but here taken substantially along the line 10—10 in FIG. 7 and depicting the nozzle in the afterburn or wet position; and, FIG. 11 is a sectional view taken substantially along the line 11—11 in FIG. 8 and illustrating particularly the flow of cooling air about the transverse upper nozzle strut.

In accordance with one of the important aspects of the present invention, there has been provided a simple, light-weight, compact, variable area, asymmetric convergent or CD afterburner exhaust nozzle characterized by its relatively low angle $\theta$ between the wing chord reference plane WCRP and the trailing edge line-of-sight $LOS_{te}$, yet which does not intrude into and/or unnecessarily compromise the critical wing spar structural space of the airfoil, and which avoids the need for complex heavy static pressure balancing chambers and their requisite structural elements and seals. Thus, as best illustrated by reference to FIGS. 5 through 7 conjointly, the exemplary variable area asymmetric nozzle of the present invention is generally indicated at 50 and is here shown as comprising a nozzle casing 51 co-axial with an afterburner or augmentor casing 52 tucked tightly beneath, and supported from the engine (not shown) which is, in turn, supported from the wing spar structure (not shown) of an airfoil 24 having a trailing edge TE. The nozzle casing 51 comprises: (i) a stationary upper nozzle duct, generally indicated at 54, defining a stationary upper nozzle wall 55 and a pair of depending spaced nozzle sidewalls 56, 58 (as best shown in FIGS. 8 and 9); and (ii) a translatable nozzle swing tray, generally indicated at 59, defining a translatable lower nozzle floor 60 and a pair of spaced upstanding nozzle sidewalls 61, 62 (FIGS. 8 and 9).

In carrying out the present invention, the translatable nozzle swing tray 59 is supported from the upper stationary nozzle duct 54 by means of a four-bar linkage assembly comprising: (i) a first pair of relatively long support links 64, 65 (FIGS. 6, 7 and 8) pivotally mounted at their upper ends 66, 68 on the stationary nozzle duct 54 and at their lower ends 69, 70 on the rearward portions of the upper edges of the upstanding sidewalls 61, 62, respectively, of swing tray 59; and (ii), a second pair of relatively short support links 71, 72 (FIGS. 6, 7 and 8) pivoted at their upper ends 74, 75 on the upper nozzle duct 54 and at their lower ends 76, 78 on the forward portions of the edges of the upstanding sidewalls 61, 62, respectively, of swing tray 59. The arrangement is such that pivotal movement of the four-bar linkage assembly 64, 65 and 71, 72 about the respective pivot points of the links permits the lower translatable nozzle swing tray 59 to rock or translate with pendular movement between the cruise position shown in FIG. 6 defining a minimum nozzle opening 79 (see, FIG. 9) and the afterburn position shown in FIG. 7 defining a maximum nozzle opening 80 (see, FIG. 10).

To permit controlled translation of the lower swing tray 59, generally horizontal linear actuators 81, 82 (see, FIGS. 6, 7 and 8; actuator 82 is visible only in FIG. 8) are respectively coupled on opposite sides of the nozzle casing 51 to the upper nozzle duct 54 and to the points of pivotal connection 69, 70 between the relatively long support links 64, 65 and the upstanding sidewalls 61, 62 of the lower swing tray 59. Such actuators 81, 82 (only actuator 81 being visible in FIGS. 6 and 7) are conventional in construction and mode of operation and are not, therefore described herein in detail, except to say that both actuators are synchornized to act in unison to insure that the swing tray 59 and upper nozzle duct 54 remain in alignment during translation. Rather, it should suffice to state that extension of the actuators 81, 82 serves to cause the support links 64, 65 and 71, 72 to pivot in a counterclockwise direction (as viewed in the drawings) about their points of pivotal connection to the upper nozzle duct 54, thus shifting the lower swing tray 59 to the cruise position indicated in FIG. 6. Conversely, contraction of the actuators 81, 82 serves to cause the links to pivot about their points of pivotal connection to the upper nozzle duct in a clockwise direction as viewed in the drawings, thereby translating the lower swing tray in a downward and forward direction—i.e., away from the airfoil trailing edge TE—to the afterburn position shown in FIG. 7.

Because of the closely tucked position of the nozzle assembly 50 of the present invention beneath the airfoil 24, relatively long, under-wing heat shields 84 are positioned on the under surface of the airfoil 24 between the exit opening of nozzle 50 and the trailing edge TE of the airfoil, with vertical heat shields 85 (FIG. 9) being disposed at the mid-point between adjacent engine centerlines, thereby protecting the exposed external surfaces of the aircraft from the hot exhaust stream.

Those skilled in the art will appreciate that in keeping with the invention, peripheral pressure seals are preferably disposed about the three upper edges of the lower swing tray 59 in sealing relationship between the translatable swing tray 59 and the stationary nozzle duct 54. Such pressure seals are preferably exposed to continuous engine fan bleed air at maximum temperatures of 250° F. which is used within the nozzle duct to film cool the heat shield liners 86 (FIGS. 8-11) during afterburner operation. (See, for example, FIGS. 8-11 where it will be noted that such film of cooling engine fan bleed air is directed through the passages 87 defined by: (i) the heat shield 86 and the walls 55, 56, 58 of stationary duct 54; (ii) heat shield 86 and the transverse upper nozzle struts 88; and (iii), heat shield 86 and the walls 60, 61, 62 of the tray 59; as indicated by the arrows).

In carrying out the sealing aspects of the present invention, longitudinal nozzle air sealing assemblies, generally indicated at 89 in FIGS. 8-10, are preferably fastened along the upper longitudinal edge beams of the upstanding sidewalls 61, 62 on the lower swing tray 59, with such assemblies including suitable carbon bearing blocks defining seals 90 disposed in wiping sealing engagement with external seal wiping panels 91 formed on the outer surfaces of the depending sidewalls 56, 58 on the stationary nozzle duct 54. The arrangement is such that the carbon bearing blocks or seals 90 perform a dual function—viz., (i) they provide effective longitudinal seals between the stationary nozzle duct 54 and the movable swing tray 59 at all operative positions of the latter; and (ii), they resist transverse movement of the swing tray 59 relative to the stationary nozzle duct 54 so as to maintain proper alignment of the tray 59 and duct 54 at all operative positions of the nozzle components. As best illustrated by reference to FIGS. 6 and 7 conjointly, it will be noted that a transverse sealing surface 92 and seal 93 are formed along the upper surface of the transverse or leading edge of the lower swing tray 59 and positioned to form a transverse third seal between the swing tray 59 and the rounded transverse lower edge 94 of the nozzle casing 51.

Figure 6:
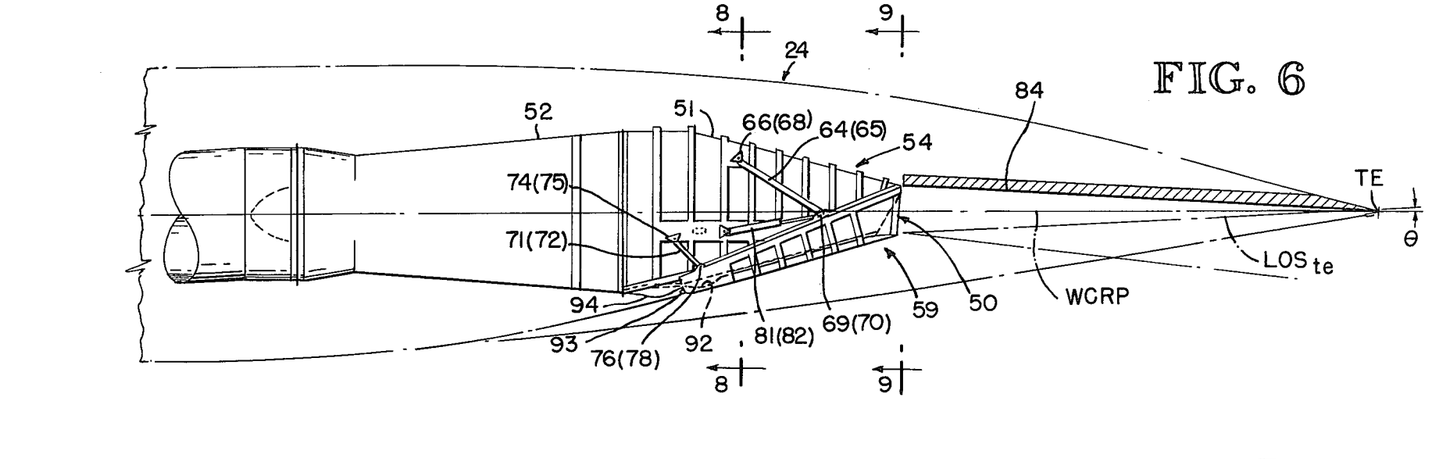
FIG. 6 is a fragmentary elevational view here illustrating a jet engine with a convergent afterburner nozzle embodying the features of the present invention suspended under the wing spar structure of an airfoil, shown in phantom, and illustrating particularly the absence of intrusion of the nozzle structure into the critical wing spar structural space even when in the convergent cruise position and, also, the highly improved trailing edge line-of-sight which here defines an included $\theta$ angle with the wing chord reference plane of only on the order of about 2° to about 3°.

Referring to FIG. 6, it will be appreciated that the arrangement hereinabove described provides a lightweight, compact, simplified variable area convergent or CD nozzle assembly which does not intrude unnecessarily into the critical wing spar structural space, which does not require the use of static pressure load balance chambers, and which permits attainment of a trailing edge line of sight $LOS_{te}$ defining an included angle $\theta$ with the wing chord reference plane WCRP ranging between about 2° and about 3°. The four-bar linkage assembly 64, 65 and 71, 72 serves to carry the static pressure loads; while the horizontally oriented linear actuators 81, 82 provide the low forces required to translate the swing tray 59 throughout its path of pendular movement. Because of the highly simplified support and actuation structure, variable area convergent and CD nozzles embodying the features of the present invention can be readily adapted to a broad spectrum of jet propulsion engines and a wide range of aspect ratio designs. Actuator forces and failsafe conditions are regulated by the angulation, length, and swing arcs of the individual links defining the four-bar linkage assembly.

What is claimed is:

1. In a jet propulsion engine of the type adapted to be mounted on an airfoil's wing spar structure and having either a convergent or a CD jet nozzle defining a minimal included angle $\theta$ between the wing chord reference plane and the trailing edge line-of-sight into the nozzle, a nozzle assembly comprising, in combination:
   (a) a fixed stationary upper nozzle duct fixedly mounted on the engine mounted on the airfoil's wing spar structure and defining a stationary upper nozzle wall and a first pair of stationary spaced depending nozzle sidewalls;
   (b) a translatable lower swing tray defining a bottom nozzle floor and a second pair of spaced upstanding nozzle sidewalls, said first and second pairs of nozzle sidewalls being mounted in overlapping relation with respect to one another with freedom for relative movement therebetween;
   (c) mounting means for pivotally coupling said translatable lower swing tray to said fixed stationary upper duct with freedom for controlled fore and aft pendular rocking movement with respect thereto;
   (d) sealing means mounted on the forward end of said swing tray and interposed between said swing tray and the lower aft end of the engine and defining a wiping seal therebetween at all fore and aft positions of said swing tray; and,
   (e) actuating means for rocking said swing tray in a fore and aft direction relative to the engine between a first convergent cruise nozzle position defining a minimal nozzle opening and a second convergent afterburner nozzle position defining a maximum nozzle opening.

2. The nozzle assembly of claim 1 wherein said mounting means comprises a four-bar linkage mechanism including: a first pair of links pivotally connected at their upper ends to respective different ones of said depending nozzle sidewalls on said stationary nozzle duct, and pivotally connected at their lower ends to the forward ends of respective different ones of said upstanding nozzle sidewalls on said swing tray; and, a second pair of links positioned aft of said first pair of links and pivotally connected at their upper ends to respective different ones of said depending nozzle sidewalls on said stationary nozzle duct, and pivotally connected at their lower ends to the rearward ends of respective different ones of said upstanding nozzle sidewalls on said swing tray.

3. The nozzle assembly of claim 2 wherein said second pair of links are longer than said first pair of links.

4. The nozzle assembly of claims 1, 2 or 3 wherein said actuating means comprises expandable and contractable linear actuating means pivotally connected at one end to said nozzle duct and at the opposite end to said swing tray whereby upon expansion of said linear actuating means said swing tray is translated rearwardly and upwardly to a convergent cruise nozzle position and upon contraction of said linear actuating means said swing tray is translated forwardly and downwardly to a convergent afterburn nozzle position.

5. The nozzle assembly of claims 1, 2 or 3 wherein the angle $\theta$ between the wing chord reference plane and the trailing edge line-of-sight into said nozzle opening when said nozzle is in the convergent cruise position is less than about 3°.

6. The nozzle assembly of claims 1, 2 or 3 wherein the angle θ between the wing chord reference plane and the trailing edge line-of-sight into said nozzle opening when said nozzle is in the convergent cruise position is in the range of from about 2° to about 3°.

7. In an airfoil mounted jet propulsion engine of the type having a variable area asymmetric afterburner exhaust nozzle, the combination comprising:
 (a) an airfoil having a wing spar structure, a trailing edge, and defining a wind chord reference plane passing through said trailing edge;
 (b) a jet propulsion engine including an afterburner casing and an asymmetric afterburner exhaust nozzle casing fixedly secured to said engine and wherein said engine is secured to, and suspended from, said wing spar structure and tucked tightly beneath said airfoil;
 (c) said asymmetric afterburner exhaust nozzle casing terminating in a variable area exhaust nozzle opening disposed forwardly of said airfoil trailing edge and beneath said airfoil;
 (d) said asymmetric afterburner exhaust nozzle casing comprising a fixed stationary upper nozzle duct fixedly mounted on said engine afterburner casing and defining a stationary upper nozzle wall and a first pair of stationary spaced depending nozzle sidewalls, a translatable lower swing tray defining a bottom nozzle floor and a second pair of spaced upstanding nozzle sidewalls, said first and second pairs of nozzle sidewalls being mounted in overlapping relation with respect to one another with freedom for relative movement therebetween;
 (e) mounting means for pivotally coupling said translatable lower swing tray to said fixed stationary upper duct with freedom for controlled fore and aft pendular rocking movement with respect thereto;
 (f) sealing means mounted on the forward end of said swing tray and interposed between said swing tray and the lower aft end of said afterburner casing and defining a wiping seal therebetween at all fore and aft positions of said swing tray; and,
 (g) actuating means for rocking said swing tray in a fore and aft direction relative to said engine between a first convergent cruise nozzle position defining a minimal nozzle opening and a second convergent afterburner nozzle position defining a maximum nozzle opening.

8. The combination as set forth in claim 7 further including heat shield means secured to the lower surface of said airfoil and extending from said nozzle opening to said trailing edge.

9. The combination as set forth in claims 7 or 8 wherein the included angle θ defined by said wing chord reference plane and the line-of-sight passing through said trailing edge and extending into said nozzle opening when said nozzle is in the convergent cruise position is less than about 3°.

10. The combination as set forth in claims 7 or 8 wherein the included angle θ defined by said wing chord reference plane and the line-of-sight passing through said trailing edge and extending into said nozzle opening when said nozzle is in the convergent cruise position is in the range of from about 2° to about 3°.

11. The combination as set forth in claim 7 wherein said mounting means comprises a four-bar linkage mechanism including: a first pair of links pivotally connected at their upper ends to respective different ones of said depending nozzle sidewalls on said stationary nozzle duct, and pivotally connected at their lower ends to the forward ends of respective different ones of said upstanding nozzle sidewalls on said swing tray; and, a second pair of links positioned aft of said first pair of links and pivotally connected at their upper ends to respective different ones of said depending nozzle sidewalls on said stationary nozzle duct, and pivotally connected at their lower ends to the rearward ends of respective different ones of said upstanding nozzle sidewalls on said swing tray.

12. The combination as set forth in claim 11 wherein said second pair of links are longer than said first pair of links.

13. The combination as set forth in claims 7, 11 or 12 wherein said actuating means comprise linear actuating means pivotally connected at one end to said nozzle duct and at the opposite end to said swing tray whereby upon expansion of said linear actuating means said swing tray is translated rearwardly and upwardly to a convergent cruise nozzle position and upon contraction of said linear actuating means said swing tray is translated forwardly and downwardly to a convergent afterburn nozzle position.

14. In a jet propulsion engine of the type adapted to be mounted on an airfoil's wing spar structure and having either a convergent or a CD jet nozzle defining a minimal included angle θ between the wing chord reference plane and the trailing edge line-of-sight into the nozzle, a nozzle assembly comprising, in combination:
 (a) a fixed stationary upper nozzle duct fixedly mounted on the engine mounted on the airfoil's wing spar structure and defining a stationary upper nozzle wall and a first pair of stationary spaced depending nozzle sidewalls;
 (b) a translatable lower swing tray defining a bottom nozzle floor and a second pair of spaced upstanding nozzle sidewalls, said first and second pairs of nozzle sidewalls being mounted in overlapping relation with respect to one another with freedom for relative movement therebetween;
 (c) mounting means for pivotally coupling said translatable lower swing tray to said fixed stationary upper duct with freedom for controlled fore and aft pendular rocking movement with respect thereto, said mounting means comprising a four-bar linkage mechanism including:
  (i) a first pair of links pivotally connected at their upper ends to respective different ones of said depending nozzle sidewalls on said stationary nozzle duct, and pivotally connected at their lower ends to the forward ends of respective different ones of said upstanding nozzle sidewalls on said swing tray; and,
  (ii) a second pair of links positioned aft of said first pair of links and pivotally connected at their upper ends to respective different ones of said depending nozzle sidewalls on said stationary nozzle duct, and pivotally connected at their lower ends to the rearward ends of respective different ones of said upstanding nozzle sidewalls on said swing tray; and,
 (d) actuating means for rocking said swing tray between a first convergent cruise nozzle position defining a minimal nozzle opening and a second convergent afterburn nozzle position defining a maximum nozzle opening, said actuating means comprising a pair of expandable and contractable linear actuating means disposed in a generally horizontal plane and having their forward ends pivotally connected to said nozzle duct and their rearward ends pivotally connected to said swing tray at the point of pivotal connection of the lower ends of said second pair of links to said swing tray whereby upon expansion of said linear actuator means said swing tray is translated rearwardly and upwardly to a convergent cruise nozzle position and upon contraction of said linear actuator means said swing tray is translated forwardly and downwardly to a convergent afterburn nozzle position.

15. The nozzle assembly of claim 14 wherein said second pair of links are longer than said first pair of links.

16. In an airfoil mounted jet propulsion engine of the type having a variable area asymmetric afterburner exhaust nozzle, the combination comprising:
   (a) an airfoil having a wing spar structure, a trailing edge, and defining a wing chord reference plane passing through said trailing edge;
   (b) a jet propulsion engine including an afterburner casing and an asymmetric afterburner exhaust nozzle casing fixedly secured to said engine and wherein said engine is secured to, and suspended from, said wing spar structure and tucked tightly beneath said airfoil;
   (c) said asymmetric afterburner exhaust nozzle casing terminating in a variable area exhaust nozzle opening disposed forwardly of said airfoil trailing edge and beneath said airfoil;
   (d) said asymmetric afterburner exhaust nozzle casing comprising a fixed stationary upper nozzle duct fixedly mounted on said engine afterburner casing and defining a stationary upper nozzle wall and a first pair of stationary spaced depending nozzle sidewalls, a translatable lower swing tray defining a bottom nozzle floor and a second pair of spaced upstanding nozzle sidewalls, said first and second pairs of nozzle sidewalls being mounted in overlapping relation with respect to one another with freedom for relative movement therebetween;
   (e) mounting means for pivotally coupling said translatable lower swing tray to said fixed stationary upper duct with freedom for controlled fore and aft pendular rocking movement with respect thereto, said mounting means comprising a four-bar linkage mechanism including:
      (i) a first pair of links pivotally connected at their upper ends to respective different ones of said depending nozzle sidewalls on said stationary nozzle duct, and pivotally connected at their lower ends to the forward ends of respective different ones of said upstanding nozzle sidewalls on said swing tray; and,
      (ii) a second pair of links positioned aft of said first pair of links and pivotally connected at their upper ends to respective different ones of said depending nozzle sidewalls on said stationary nozzle duct, and pivotally connected at their lower ends to the rearward ends of respective different ones of said upstanding nozzle sidewalls on said swing tray; and,
   (f) actuating means for rocking said swing tray between a first convergent cruise nozzle position defining a minimal nozzle opening and a second convergent afterburn nozzle position defining a maximum nozzle opening, said actuating means comprising a pair of expandable and contractable linear actuating means disposed in a generally horiziontal plane and having their forward ends pivotally connected to said nozzle duct and their rearward ends pivotally connected to said swing tray at the point of pivotal connection of the lower ends of said second pair of links to said swing tray whereby upon expansion of said linear actuator means said swing tray is translated rearwardly and upwardly to a convergent cruise nozzle position and upon contraction of said linear actuator means said swing tray is translated forwardly and downwardly to a convergent afterburn nozzle position.

17. The combination as set forth in claim 16 wherein said second pair of links are longer than said first pair of links.

18. The combination as set forth in claims 16 or 17 further including heat shield means secured to the lower surface of said airfoil and extending from said nozzle opening to said trailing edge.

19. The combination as set forth in claims 16 or 17 wherein the included angle $\theta$ defined by said wing chord reference plane and the line-of-sight passing through said trailing edge and extending into said nozzle opening when said nozzle is in the convergent cruise position is less than about 3°.

20. The combination as set forth in claims 16 or 17 wherein the included angle $\theta$ defined by said wing chord reference plane and the line-of-sight passing through said trailing edge and extending into said nozzle opening when said nozzle is in the convergent cruise position is in the range of from about 2° to about 3°.

* * * * *